US005569917A

United States Patent [19]

Buttrill, Jr. et al.

[11] Patent Number: 5,569,917

[45] Date of Patent: Oct. 29, 1996

[54] APPARATUS FOR AND METHOD OF FORMING A PARALLEL ION BEAM

[75] Inventors: Sidney E. Buttrill, Jr., Palo Alto; Alex V. Mordehai, Mountain View, both of Calif.

[73] Assignee: Varian Associates, Inc., Palo Alto, Calif.

[21] Appl. No.: 446,101

[22] Filed: May 19, 1995

[51] Int. Cl.$^{6}$ .............................. B01D 59/44; H01J 49/00

[52] U.S. Cl. .............................. 250/292; 250/282; 250/287; 250/423 R

[58] Field of Search .............................. 250/282, 291, 250/292, 423 R, 287

[56] References Cited

U.S. PATENT DOCUMENTS 3,922,543 11/1975 Beachamp .............................. 250/291
5,171,991 12/1992 Johnson et al. .............................. 250/292

*Primary Examiner*—Bruce C. Anderson
*Attorney, Agent, or Firm*—Allan Lowe

[57] ABSTRACT

A time-of-flight mass spectrometer includes an ion beam source having a quadrupole ion trap. To form a parallel ion beam, the ions are simultaneously sucked and pulsed out of an interaction region of the trap through an opening in a front end cap electrode of the trap by applying different polarity voltage pulses at the same time to the front end cap electrode and a back end cap electrode of the trap.

33 Claims, 4 Drawing Sheets

APPARATUS FOR AND METHOD OF FORMING A PARALLEL ION BEAM

FIELD OF THE INVENTION

The present invention relates generally to an apparatus for and method of forming a parallel ion beam particularly adapted to be used with a time-of-flight mass spectrometer and, more particularly, to such an apparatus and method wherein molecules and/or ions to be analyzed are compressed in a region of an ion trap having first and second end cap electrodes, and the ions are simultaneously sucked and pushed out of an interaction region by applying different polarity voltages to the end cap electrodes at the same time.

BACKGROUND ART

Paul et al., U.S. Pat. Nos. 2,950,389 and 2,939,952, disclose the use of a three-dimensional quadrupole ion trap and the theory thereof. The use of an ion trap as an ion source of a mass spectrometer is known. Reference herein to an r.f. ion trap is understood to mean a quadrupole type apparatus following the teaching of Paul et al. The r.f. ion trap mass spectrometer enables molecules and/or ions of a source to be analyzed and detected. The ions are collected in an interaction region defined by a torroidal electrode, typically having a hyperboloid contour, and a pair of end cap electrodes, also usually including hyperbolic surfaces. An r.f. voltage and a DC voltage are applied to the torroidal electrode while a DC voltage pulse is applied to only one of the end cap electrodes. The other end cap electrode is at ground potential. Ions are formed in the interaction region by supplying to the region electrons that interact with the molecules.

The ions are accumulated in the trap interaction region to produce a mass spectrum with acceptable signal-to-noise ratio. The ions are also compressed in physical space and the velocity thereof is reduced by interaction with a neutral, buffer gas in the interaction region of the ion trap. Multiple collisions between trapped ions and the neutral, buffer gas reduce the energy of the ions and cause a smaller and cooler ion cloud to be localized in the ion trap central interaction region. The spatially compressed ion cloud having relatively low velocity ions is much better suited to mass analysis than an ion beam dispersed over a much larger volume.

In one prior art arrangement, the ions located in the trap are somewhat efficiently removed and transferred to form an ion beam which enters a reflection type mass spectrometer, of the type disclosed by Mamyrin et al., *Soviet Physics-JETP*, Vol. 37 (1973), pages 45–48, in an article entitled "The Mass-Reflectron, A New Non-Magnetic Time-of-Flight Mass Spectrometer with High Resolution."

In the prior art, the ions are either "sucked out" or "pulsed out," i.e., "pushed out" of the interaction region through an aperture in one of the end cap electrodes to form the ion beam. Bonner et al., *International Journal of Mass Spectrometry and Ion Physics*, Vol. 10 (1972/73), pages 197–203 in an article entitled "Ion-Molecule Reaction Studies with a Quadrupole Ion Storage Trap" discloses an ion trap in which positive ions are transferred from the ion trap to a quadrupole mass spectrometer analyzer using a pulse out mode wherein a negative voltage pulse is applied to a front end cap electrode having an opening therein through which the ion beam propagates. Fulford et al., *Journal of Vacuum Space and Technology*, Vol. 17 (1980), pages 829–835, in an article entitled "Radio-Frequency Mass Selective Excitation and Resonant Ejection of Ions in a Three-dimensional Quadrupole Ion Trap" discloses an apparatus similar to that disclosed by Bonner et al., but operated in the suck out mode, wherein a positive voltage pulse is applied to a back end cap electrode opposite from the front end cap electrode. Mather et al., *International Journal of Mass Spectrometry and Ion Physics*, Vol. 28 (1978), pages 347–364, in an article entitled "The Quadrupole Ion Storage Trap (QUISTOR) As a Low-Pressure Chemical Ionization Source for a Magnetic Sector Mass Spectrometer" discloses an ion trap operated in a pulse out mode as an ion source for a magnetic sector mass spectrometer.

More recently, ion traps have been used as integrating ion sources for time-of-flight mass spectrometers. Ions have been ejected from the ion trap into the time-of-flight mass spectrometers using one of the suck out mode or the pulse out mode, as disclosed by Chien et al., *Rapid Communications in Mass Spectrometry*, Vol. 7 (1993), pages 837–843, in an article entitled "Enhancement of Resolution in a Matrix-Assisted Laser Desorption Using an Ion-Trap Storage/Reflection Time of Flight Mass Spectrometer" and Fountain et al., *Rapid Communications in Mass Spectrometry*, Vol. 8 (1994), pages 487–494, in an article entitled "Mass-Selective Analysis of Ions in Time of Flight Mass Spectrometry Using an Ion Trap Storage Device."

In the prior art, an arrangement of gridded electrodes (not an r.f. ion trap) was employed to produce an electrostatic field configuration which enhanced the local density of positive ions trapped in an electron beam. Through a combination of static electric fields and suitable pulses applied to the electrodes, these ions were efficiently extracted into a time-of-flight mass spectrometer. This arrangement is described by M. H. Studier in *The Review of Scientific Instruments*, Vol. 34, No. 12, (December 1963), pages 1367–1370.

In ion trap time-of-flight mass spectrometers it is important for the ion beam, as it enters the time-of-flight mass spectrometer, to have all ions with different energies at the same spatial location at the same time as can be achieved by an ion beam having parallel trajectories for different energies, i.e., a collimated ion beam. This is particularly true of time-of-flight mass spectrometers including a reflector and detector, as disclosed by Mamyrin et al. (supra).

In our studies, we have found that the prior art pulse out, i.e., push out, and suck out modes do not produce collimated ion beams. Instead, the push out method produces a divergent ion beam which is only partially transmitted through the opening in the front end cap electrode of the ion trap. Hence, the efficiency in transferring ions from the ion trap to the time-of-flight mass spectrometer is materially reduced because there is a substantial decrease in the number of ions in the beam which is coupled to the spectrometer.

For the suck out case, we have found increasing the extraction voltage applied to the apertured front end cap causes greater divergence of the ion beam with resulting decreases in efficiency.

Our investigations have found the prior art suck out technique results in an ion beam having a strongly convergent trajectory, with a crossover point somewhat downstream of the front end cap electrode. While none of the ions in the ion beam strike the front end cap electrode, the resulting ion beam is so divergent downstream of the crossover point that the ion beam cannot be focused back into a parallel beam without strong ion optics which introduce dispersion in the ion flight times.

We have found that the electric fields resulting from the voltages applied to the end caps are curved significantly and have substantial gradients in the regions where the ion beam is formed in the ion trap, using both the suck out and push out methods. In addition, the electric field gradients are asymmetrical, with gradients occurring only on the side of the ion beam between the polarized end cap electrode and the point or region in the ion trap where the beam is initially formed. Hence, neither of the prior art suck out or pull out techniques is capable, by itself, of producing a parallel ion beam suitable for efficient transmission through a time-of-flight mass spectrometer of the reflection type disclosed by Mamyrin et al.

It is, accordingly, an object of the present invention to provide a new and improved method of and apparatus for forming a collimated ion beam.

Another object of the present invention is to provide a new and improved ion trap for forming a parallel ion beam, particularly useful for a time-of-flight mass spectrometer, wherein virtually all of the ions with different energies enter the spectrometer at substantially the same time.

Another object of the invention is to provide a new and improved method of and apparatus for forming a collimated ion beam with an ion trap having a torroidal electrode excited by an r.f. source and a pair of end cap electrodes, one of which includes an opening through which the collimated ion beam flows, wherein the ion trap is constructed in such a manner that the ion beam is not incident on the apertured end cap.

Another object of the present invention is to provide a new and improved method of and apparatus for forming a parallel ion beam through the use of an ion trap including a torroidal r.f. excited electrode and a pair of end cap electrodes, one of which is apertured, wherein the ion beam is formed so that it does not converge on a point downstream of the apertured end cap and then diverge.

An additional object of the invention is to provide a new and improved ion trap method and apparatus, wherein the location in the ion trap where the ion beam is initially formed lies along a relatively straight electric field line having virtually no curvature in the ion trap.

DISCLOSURE OF THE INVENTION

In accordance with one aspect of the invention, a collimated ion beam is formed by compressing ions in a region of an ion trap having first and second end cap electrodes, wherein the ions are simultaneously sucked and pulled out of the region through an opening in one of the electrodes by applying different polarity voltages to both electrodes at the same time.

In a preferred use, the beam is applied to a time-of-flight mass spectrometer entrance region located so different energy ions in the beam traverse the entrance region at the same time. The time-of-flight spectrometer preferably reflects the beam to a detector region in the spectrometer.

In the preferred embodiment, the voltages applied to the first and second electrodes have leading edges that occur at substantially the same time and the voltages have about the same magnitudes, although they may differ.

The above and still further objects, features and advantages of the present invention will become apparent upon consideration of the following detailed description of a specific embodiment thereof, especially when taken in conjunction with the accompanying drawings.

DESCRIPTION OF THE PREFERRED EMBODIMENT

Figure 1:
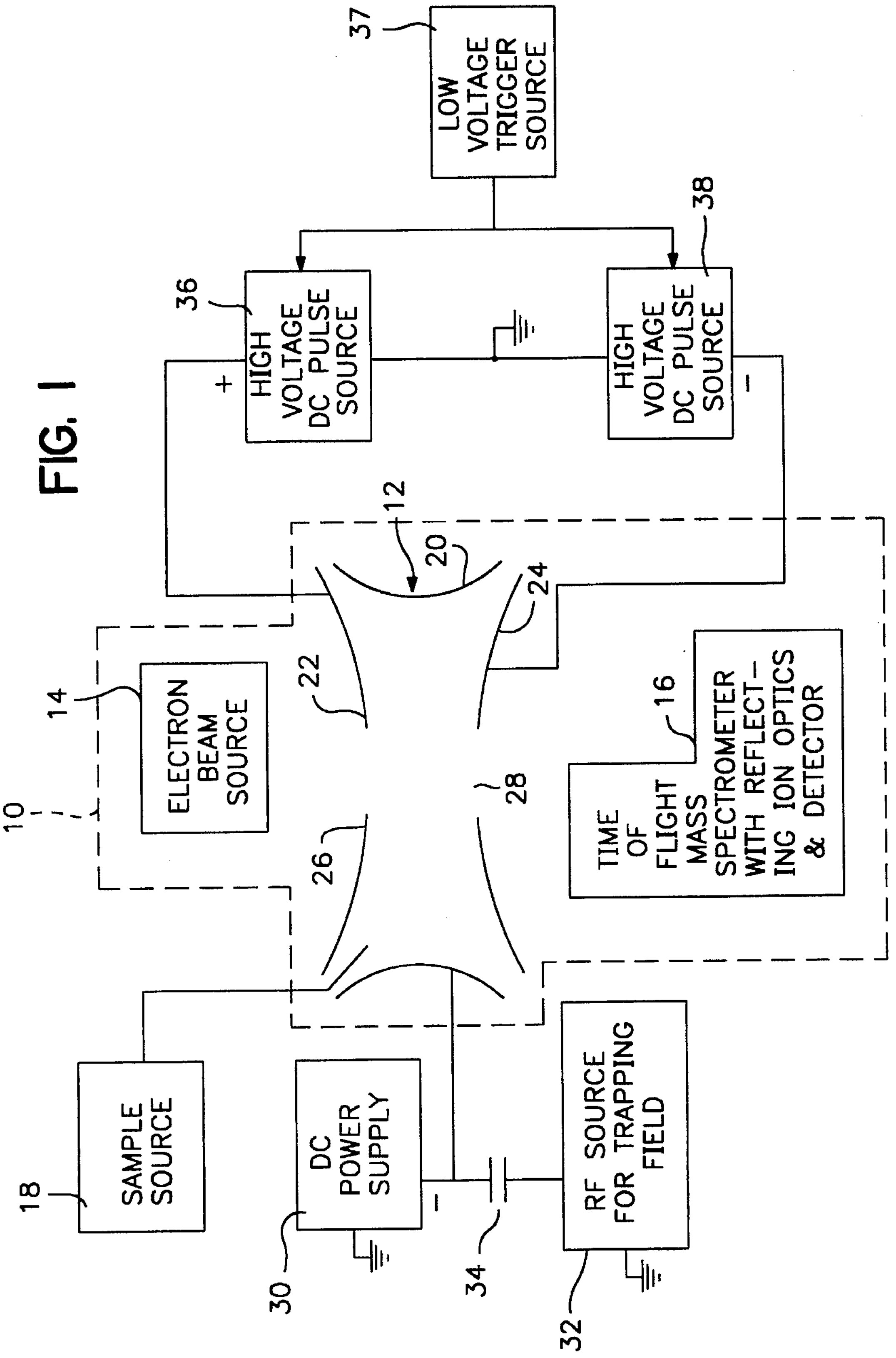
FIG. 1 is a schematic diagram of a time-of-flight mass spectrometer with an ion trap in accordance with a preferred embodiment of the invention.

Reference is now made to FIG. 1 of the drawing, wherein vacuum chamber 10 is illustrated as including ion trap 12 responsive to an electron beam from electron beam source 14 for deriving a collimated ion beam that is coupled to time-of-flight mass spectrometer 16, including reflecting electron optics and a detector, preferably of the type described by Mamyrin et al. (supra). A gaseous source to be analyzed is supplied to ion trap 12 by sample source 18; the sample from source 18 can either be molecules and/or ions.

Ion trap 12, configured as a typical quadrupole ion trap, includes torroidal electrode 20, ideally having a surface contour defined by a hyperboloid. End cap electrodes 22 and 24, also ideally having hyperbolic surfaces, respectively include openings 26 and 28. Opening 26 is responsive to the electron beam derived by source 14, while the collimated ion beam propagates through opening 28 to time-of-flight mass spectrometer 16. Torroidal electrode 20 is connected to relatively high voltage (−1600 volts in a preferred embodiment) DC power supply 30 and r.f. source 32 via capacitor 34. R.f. source 32 establishes a trapping field for the ions in ion trap 12. The ions are trapped in trap 12 by compressing them into a small volume in the trap and reducing the velocity of the ions by an interaction with a neutral gas that can be introduced into the ion trap with the sample from source 18. Trapping of the ions continues until a sufficient number of the ions have been accumulated in trap 12 to produce a mass spectrum with acceptable signal-to-noise ratio.

When a sufficient number of ions have been trapped in the interior interaction region of trap 12 between electrodes 20, 22 and 24, the ions are simultaneously sucked out of the interaction region and pushed out of the region. To this end, opposite polarity high voltage DC pulses are supplied to end cap electrodes 22 and 24 at the same time by high voltage DC pulse sources 36 and 38, respectively, both of which are driven by low voltage trigger source 40. High voltage sources 36 and 38 respectively supply positive and negative DC pulses to back and front end cap electrodes 22 and 24. The pulses preferably have steep leading edges, on the order of nanoseconds or less, and a duration sufficient to enable the majority of the accumulated ions in trap 12 to be swept from the trap as a result of the voltage pulses having widths between 5 and 10 microseconds from sources 36 and 38 being applied to end cap electrodes 22 and 24. Appropriate pulse width depends upon trap dimension, pulse amplitude and the ion masses to be extracted. The negative voltage applied by source 38 to front end cap. electrode 24 causes positive ions to be sucked from the interaction region of ion trap 12 through opening 28, while the positive voltage of source 36 applied to rear end cap electrode 22 causes ions to be pushed or pulsed out of the interaction region of ion trap 12 through opening 28 into time-of-flight mass spectrometer 16.

In the preferred embodiment, the leading edges of the pulses from sources 36 and 38 occur simultaneously, although this is not a complete necessity. There can be differences of several nanoseconds in the occurrence times of the leading edges of the pulses derived from sources 36 and 38. In one preferred embodiment, the voltages of sources 36 and 38 are equal in magnitude to each other, being in the range of 200 to 550 volts. Under certain circumstances, the voltages applied by sources 36 and 38 to electrodes 22 and 24 preferably differ somewhat from each other; in one instance, it was found desirable for the positive voltage applied by source 36 to end cap electrode 22 to be +500 volts and for the voltage applied by source 38 to end cap electrode 24 to be −420 volts. In general, it is desirable for the voltage difference between end cap electrodes 22 and 24 to be as high as possible to enable the ions to be ejected from the ion trap as quickly as possible.

The ions sucked and pushed out of ion trap 12 form a collimated ion beam that enters time-of-flight mass spectrometer 16. The ion beam forms a virtual ion source at the entrance of mass spectrometer 16 so virtually all ions in the beam, including those having different energies, arrive at the entrance at the same time. The location of the virtual ion source is consistent with the adjustment of the reflecting ion optics in time-of-flight mass spectrometer 16. In particular, the magnitudes of the pulses derived from sources 36 and 38 are such that the ions are spatially focused at the virtual ion source at the input of time-of-flight mass spectrometer 16. Time-of-flight mass spectrometer 16 having reflecting ion optics and a detector, as disclosed by Mamyrin et al., responds to such a virtual ion source to segregate the masses of the different ions very effectively. Because the ions are simultaneously pushed out and sucked out of the interaction region in the interior of ion trap 12, the ion beam can be considered as collimated, i.e., all ions in the beam have parallel trajectories.

Figure 2:
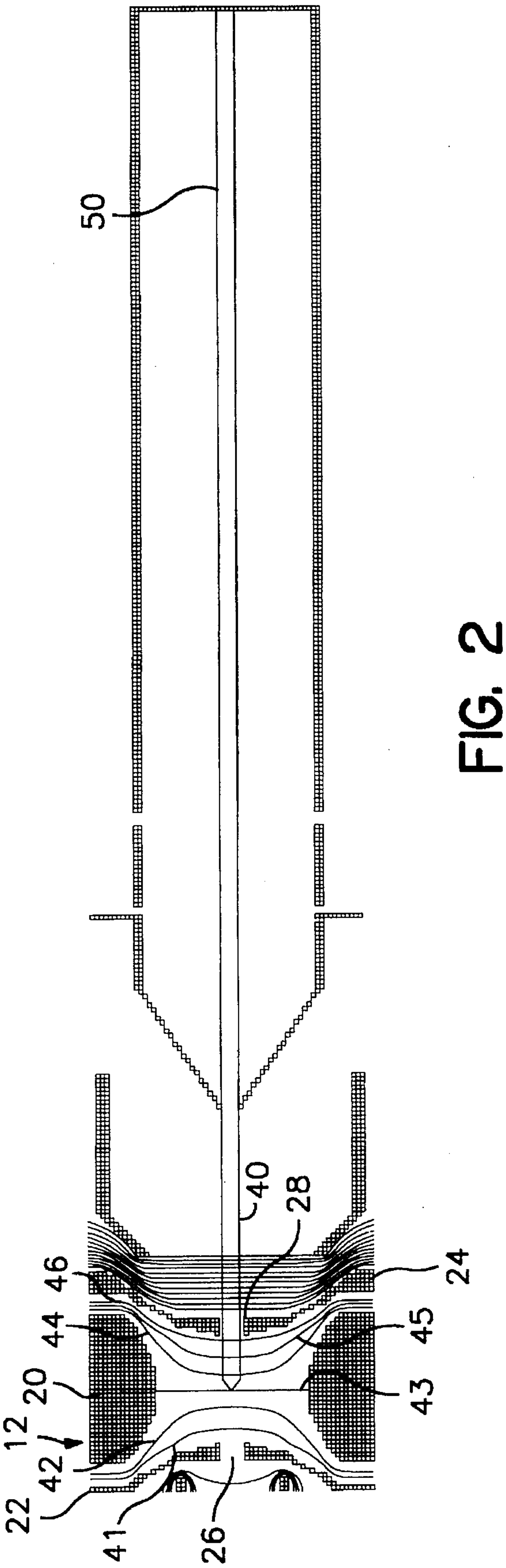
FIG. 2 is a drawing of electric fields and the ion beam generated by the apparatus of FIG. 1.

Reference is now made to FIG. 2 of the drawing, wherein parameters of the ion beam formed by the apparatus of FIG. 1 and electric field lines of this apparatus are illustrated. Ion beam 40 is formed in the interaction region of ion trap 12 between electrodes 20, 22 and 24 while constant potential electric field lines 41–46 result from the voltages from sources 36 and 38 being applied to end cap electrodes 22 and 24. The geometry of trap 12 and the values of the voltages applied to electrodes 22 and 24 are such that zero potential electric field line 43, extending completely across a plane in the middle of ion trap 12 where ion beam 10 is initiated, is a straight line.

Curved positive potential electric field lines 41 and 42, between line 43 and end cap electrode 22, result primarily from the positive voltage of pulse source 36 being applied to end cap electrode 22. Negative potential electric field lines 44–46, between end cap electrode 24 and electric field line 43, resulting from the negative voltage of source 38, curve in the opposite direction from lines 41 and 42. Straight, neutral or zero potential electric field line 43 is produced as a result of the opposite polarity and relatively equal magnitudes of the voltage pulses applied to end cap electrodes 22 and 24.

Because ion beam 40 is initiated on straight, zero electric field line 43, the trajectories of the ions in beam 40 are parallel to each other and the beam can be considered as collimated. As indicated in FIG. 2, ion beam 40 passes through aperture 28 without striking any portion of electrode 24. The ion beam propagates as a collimated beam through aperture 28 and remains in this state at its entry point into mass spectrometer 16.

The relative time position of different ions having differing energies in beam 40 at different spatial locations along the length of the beam is indicated by the darkened spots in the illustrated beam trajectory. For example, the dark spots in beam 40, as the beam passes through aperture 28, have a pronounced V or notch shape. This means that the less energetic ions in the center of the beam arrive at the aperture before the more energetic ions in the exterior portion of the beam. As beam 40 continues to propagate downstream of aperture 28 the V or notch shape becomes more pronounced and then becomes less pronounced. All of the ions in the beam arrive at the same time at region 50, as indicated by the dark line at right angles to the propagation direction of beam 40. Region 50 is considered as the virtual ion source, at the entrance of time-of-flight mass spectrometer 16.

Figure 3:
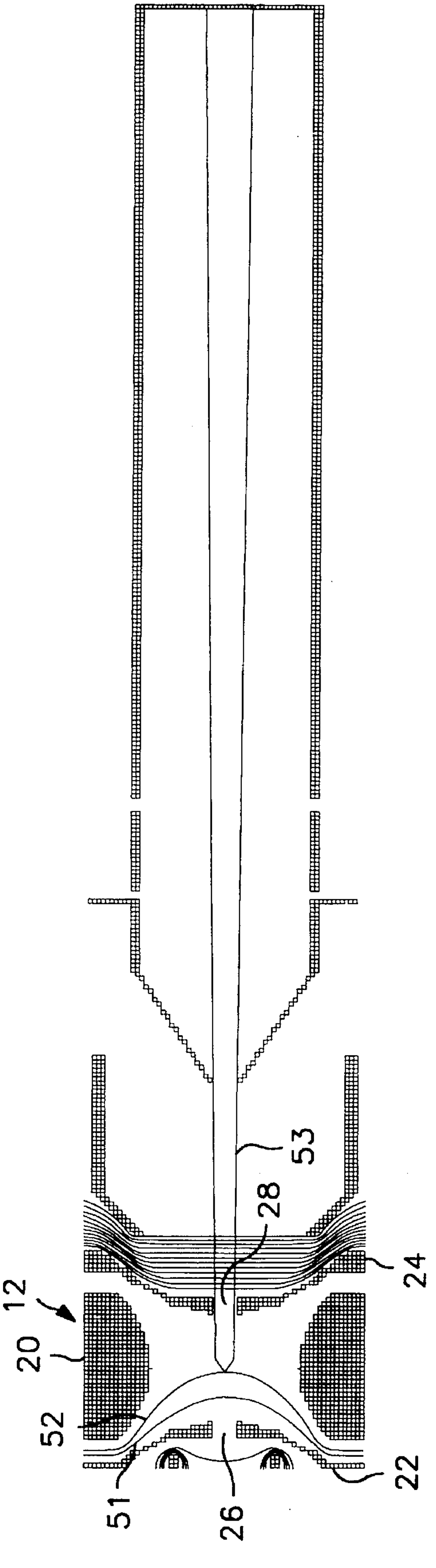
FIG. 3 PRIOR ART
FIG. 3 is a drawing similar to that of FIG. 2, but for a prior art situation wherein a positive voltage pulse is applied to a back end cap electrode.
Figure 4:
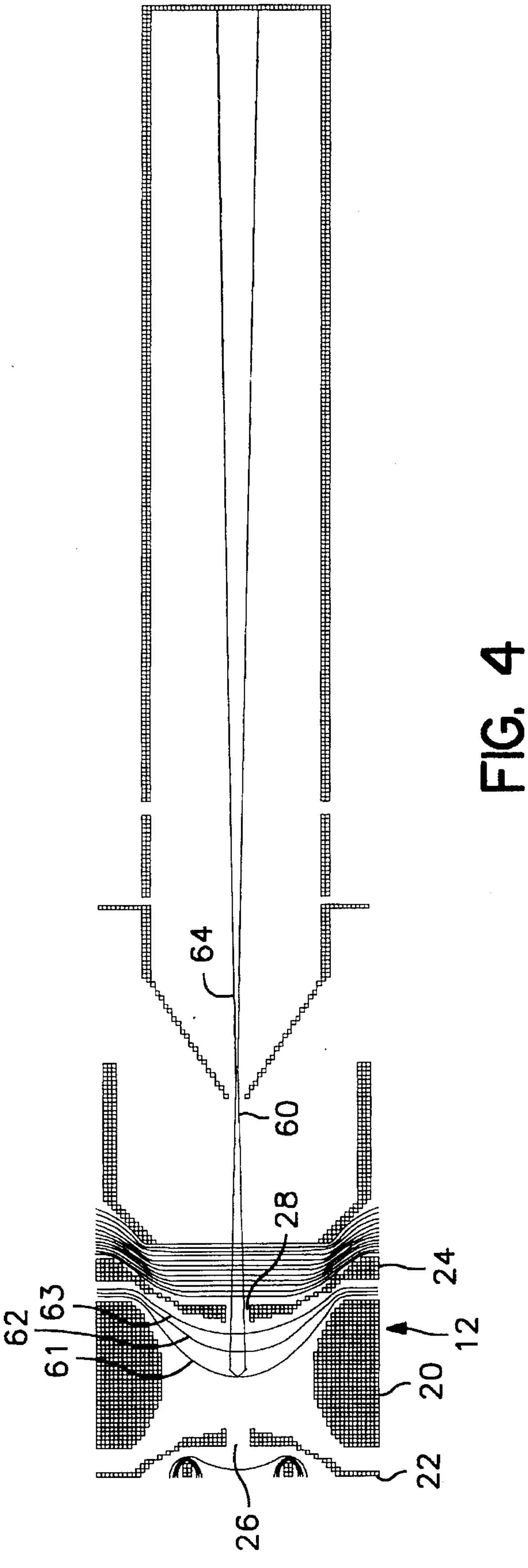
FIG. 4 PRIOR ART
FIG. 4 is a diagram similar to the diagrams of FIGS. 2 and 3, but for a prior art situation wherein a negative voltage pulse is applied to a front end cap electrode.

The electric fields and ion beam trajectory of FIG. 2, in accordance with the present invention, is to be compared with those of the prior art push out and suck out approaches, as illustrated in FIGS. 3 and 4. The ion beam trajectories illustrated in FIGS. 3 and 4 are for the same ion trap and time-of-flight mass spectrometer as illustrated in FIG. 2. In the structure illustrated in FIG. 2, the voltages of sources 36 and 38 are respectively +400 and −400 volts. For the situation illustrated in FIG. 3, a +400 volt DC pulse is applied to back end cap electrode 22 while front end cap electrode 24 is grounded. In the situation illustrated in FIG. 4, a −400 volt DC pulse is applied to front end cap electrode 24 while rear end cap electrode 22 is grounded.

In FIG. 3, electric field lines 51 and 52, resulting from the application of positive voltage from a high voltage pulse source to end cap electrode 22, have substantial curvature. Electric field line 52 extends into the middle of the interaction region of ion trap 12, where ion beam 53 is formed. Because of the curvature of field line 52 away from end cap electrode 22, ion beam 53 diverges significantly to intercept a portion of front end cap 24, causing a substantial number of ions in the beam to be incident on the front end cap. Hence, there is a substantial reduction in efficiency in transferring ions from the trap to the mass spectrometer. It is also noted from the spots in diverging ion beam 53 that there is no point where different energy ions in the beam are at the same location at the same time. In other words, there is no point in beam 53 corresponding with point 50 in FIG. 2. Hence, a time-of-flight mass spectrometer with reflecting ion optics is unable to correctly analyze the ions in beam 53 because there is no virtual ion source where all ions in the beam enter the time-of-flight mass spectrometer at the same time. While the diverging beam of FIG. 3 can be brought back to a nearly parallel beam by the action of a simple ion lens, the cost of such a lens and associated parts, such as power supplies, is considerably in excess of the cost of the additional high voltage DC pulse source employed in the present invention.

In FIG. 4, ion beam 60 is formed in the center of the interaction region of ion trap 12. Electric field lines 61, 62 and 63, all having substantial curvature, are formed in the interaction region in response to the negative voltage of pulse source 38 being applied to front end cap electrode 24, while back end cap electrode 22 is grounded. Since electric field line 61, where ion beam 60 is initially formed, has substantial curvature toward front end cap electrode 24, beam 60 initially converges at point 64, downstream of aperture 28. From convergence point 64, ion beam 60 diverges to such an extent that it cannot be focused back into a collimated beam without strong ion optics which introduce considerable dispersion in ion flight times. Hence, it is very difficult, and perhaps impossible, to provide a region in ion beam 60 corresponding to region 50 in ion beam 40. Thereby, a time-of-flight mass spectrometer having reflecting ion optics does not provide particularly accurate results if the ion beam is formed by applying a negative high voltage pulse to front end cap electrode 24, without having a high voltage pulse simultaneously applied to back end cap electrode 22.

While there has been described and illustrated one specific embodiment of the invention, it will be clear that variations in the details of the embodiment specifically illustrated and described may be made without departing from the true spirit and scope of the invention as defined in the appended claims. For example, it is not necessary, as indicated supra, for the voltages of pulse sources 36 and 38 to have exactly the same magnitude. If the positive voltage of source 36 is slightly larger in magnitude than the negative voltage of source 38, the ion beam exiting ion trap 12 diverges very slightly. This is beneficial in some ion optic designs in which a subsequent ion acceleration region produces a slightly converging lens action. The net result of the two focusing actions is a fully parallel or collimated ion beam which is effectively transmitted through the time-of-flight mass spectrometer with high efficiency. A slightly converging action may be obtained if the negative suck out pulse applied by source 38 is slightly larger in magnitude than the positive voltage of source 36. This may be advantageous in some ion optic designs or may be used to increase the number of ions transmitted through a very small aperture in a vacuum system including ion trap 12. It is also not necessary for the voltages of sources 36 and 38 to have simultaneously occurring leading edges. If the voltages of sources 36 and 38 are both fully applied to electrodes 22 and 24 before the ions begin to exit ion trap 12, the focusing action is mass dependent, which can be used to favor coupling of ions having a particular mass range from the ion trap to spectrometer 16. A further modification is that the pulses need not be simple rectangular pulses having very steep leading edges. Aspects of the invention can also be practiced using pulses having more gradual rise times or pulses which vary in amplitude while the ions are being simultaneously sucked and pushed from ion trap 12. Such shaped pulses are advantageous in compensating for mass resolution limiting effects of the initial thermal energy of ions being ejected from trap 12. It is also not necessary for the ion trap to be used with time-of-flight mass spectrometers, although such spectrometers are particularly advantageous in combination with the ion trap of the invention because of the ability of the trap to provide a collimated beam in which ions having different energies enter the time-of-flight mass spectrometer at the same time and location. In addition, it is not necessary for ion trap 12 to include hyperbolic electrodes, although such electrodes are advantageous. The principles of the invention may be employed with ion traps using electrode geometries different from the ion traps having hyperbolic electrodes. In some of these ion traps, the geometries are designed to improve ion beam focusing. Further, by use of appropriate polarities for the biases and pulses specified herein, the invention is equally applicable for negative as well as positive ions. Further still, the utility of the invention is unaffected by the location and manner wherein the ions are formed.

What is claimed is:

1. A method of forming a parallel ion beam comprising compressing ions that are to form the beam in a region of an r.f. ion trap having first and second end cap electrodes, the first electrode having an opening through which ions flow from the region to form the beam, and simultaneously sucking and pushing the ions out of the region through the opening by applying different polarity voltages to the first and second electrodes at the same time.

2. The method of claim 1 further including applying the beam to an entrance region of a time-of-flight mass spectrometer so that ions in the beam having different energies arrive at the entrance at substantially the same time.

3. The method of claim 2 further including reflecting the beam in the spectrometer to a detector region in the spectrometer.

4. The method of claim 2 wherein the voltages are derived in pulses having leading edges that occur at substantially the same time.

5. The method of claim 4 wherein the voltages have approximately the same magnitude.

6. The method of claim 4 wherein the voltages have somewhat different magnitudes.

7. The method of claim 2 wherein the voltages are derived in pulses having leading edges that occur at somewhat different times.

8. The method of claim 1 wherein the voltages are derived in pulses having leading edges that occur at substantially the same time.

9. The method of claim 8 wherein the voltages have approximately the same magnitude.

10. The method of claim 8 wherein the voltages have somewhat different magnitudes.

11. The method of claim 1 wherein the voltages have approximately the same magnitude.

12. The method of claim 1 wherein the voltages have somewhat different magnitudes.

13. A method of forming a parallel ion beam through the use of a quadrupole ion trap having (i) first and second end cap electrodes, (ii) a torroidal electrode, and (iii) an interaction region between the end cap and torroidal electrodes positioned to be responsive to electrons from an electron source and the molecules to be analyzed for forming the ions in the beam, the first electrode including an opening through which ions in the beam flow from the region; the method comprising simultaneously supplying the molecules to be analyzed and electrons from the source to the interaction region and r.f. energy to the torroidal electrode, and simultaneously sucking and pulsing the ions out of the region through the opening by applying different polarity voltages to the first and second electrodes at the same time.

14. The method of claim 13 further including applying the beam to an entrance region of a time-of-flight mass spectrometer so that ions in the beam having different energies arrive at the entrance at substantially the same time.

15. The method of claim 14 wherein the voltages are derived in pulses having leading edges that occur at substantially the same time.

16. The method of claim 13 wherein the voltages are derived in pulses having leading edges that occur at substantially the same time.

17. The method of claim 13 wherein the voltages have approximately the same magnitude.

18. The method of claim 13 wherein the voltages have somewhat different magnitudes.

19. The method of claim 13 wherein the voltages are derived in pulses having leading edges that occur at somewhat different times.

20. A parallel ion beam source comprising (a) an ion trap having first and second end cap electrodes and an interaction region between the end cap electrodes for causing the ions in the interaction region to be formed as a beam, the first electrode including an opening through which ions in the beam flow; and (b) pulse means for simultaneously sucking and pushing the ions out of the region through the opening by applying different polarity voltages to the first and second electrodes at the same time.

21. The parallel ion beam source of claim 20 wherein the ion trap includes a torroidal electrode for excitation by an r.f. source, the interaction region being between the end cap and the torroidal electrodes.

22. The parallel ion beam source of claim 20 further including a time-of-flight mass spectrometer responsive to the beam, the mass spectrometer having an entrance positioned so that ions in the beam having different energies arrive at the entrance at substantially the same time.

23. The source of claim 20 wherein the voltages are derived in pulses having leading edges that occur at substantially the same time.

24. The source of claim 20 wherein the voltages have approximately the same magnitude.

25. The source of claim 20 wherein the voltages have somewhat different magnitudes.

26. The source of claim 20 wherein the voltages are pulses having leading edges that occur at somewhat different times.

27. The source of claim 20 wherein the geometry of the ion trap and the amplitudes of the voltages are such that there is a straight electric field line completely across the interaction region, the beam being initiated along the straight electric field line.

28. In combination, a time-of-flight mass spectrometer having an entrance region responsive to a parallel beam of ions and a reflector region for directing ions in the beam to a detector region, a source of the parallel beam of ions responsive to molecules and/or ions to be analyzed by the spectrometer, including:

(a) a quadrupole ion trap having (i) first and second end cap electrodes, (ii) a torroidal electrode for excitation by an r.f. source, and (iii) an interaction region between the end cap and torroidal electrodes positioned to be responsive to electrons from an electron source and the molecules and/or ions to be analyzed for forming the ion beam, the first electrode including an opening through which ions in the beam flow to the spectrometer; and (b) pulse means for simultaneously sucking and pushing the ions in the beam out of the region through the opening by applying different polarity voltages to the first and second electrodes at the same time.

29. The combination of claim 28 wherein the voltages applied to the first and second electrodes are in pulses have leading edges that occur at substantially the same time.

30. The combination of claim 29 wherein the voltages have about the same magnitudes.

31. The combination of claim 29 wherein the voltages have differing magnitudes.

32. The combination of claim 28 wherein the voltages have about the same magnitudes.

33. The combination of claim 28 wherein the voltages have differing magnitudes.

* * * * *